Nov. 28, 1967 M. C. PFISTER 3,355,591
PHOTOELECTRIC DEVICE FOR DETERMINING THE LENGTH
OR POSITION OF A SAMPLE USING SCANNER
AND ROTATING BEAM-CHOPPER
Filed Oct. 16, 1964 4 Sheets-Sheet 1
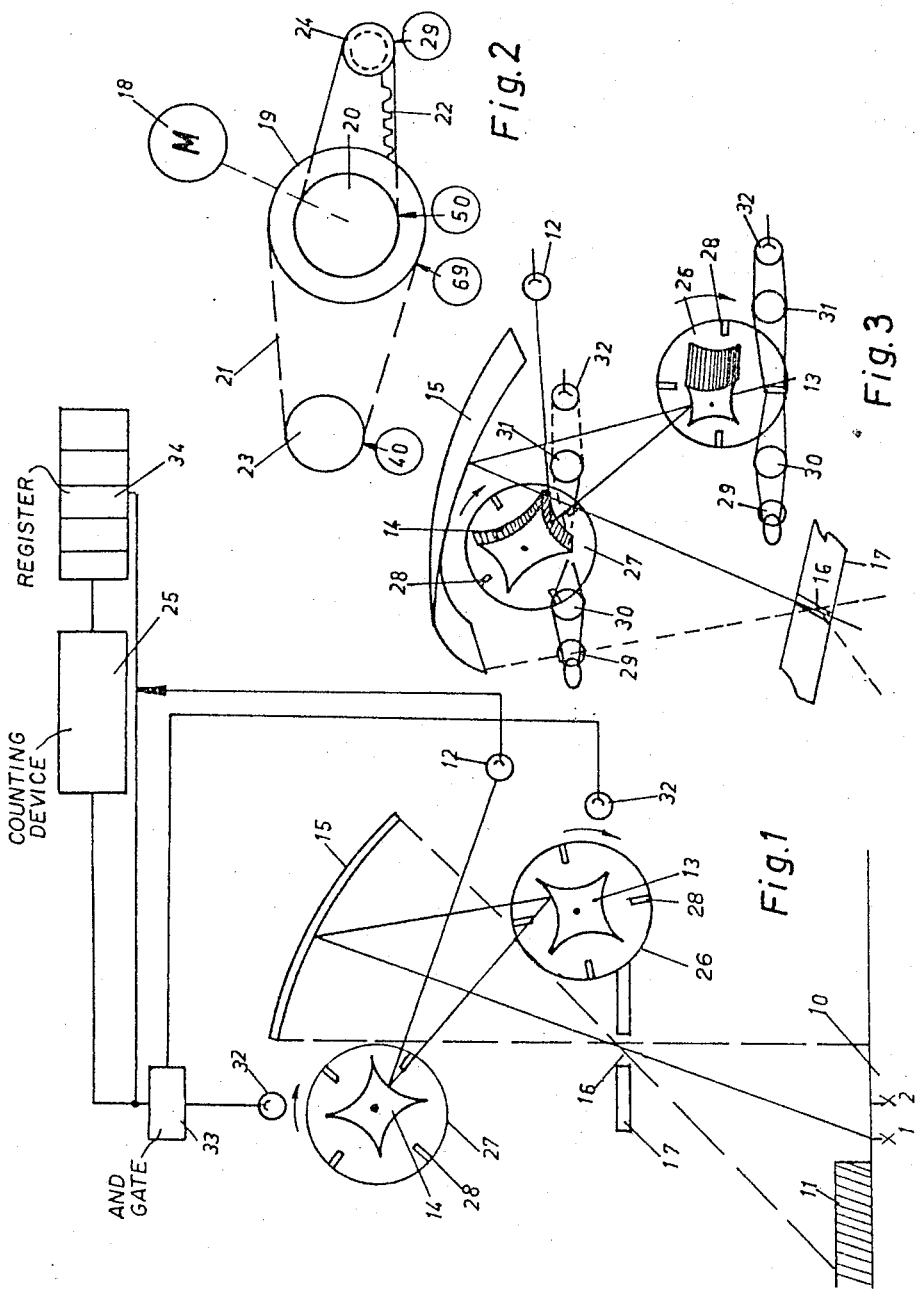
INVENTOR.
BY

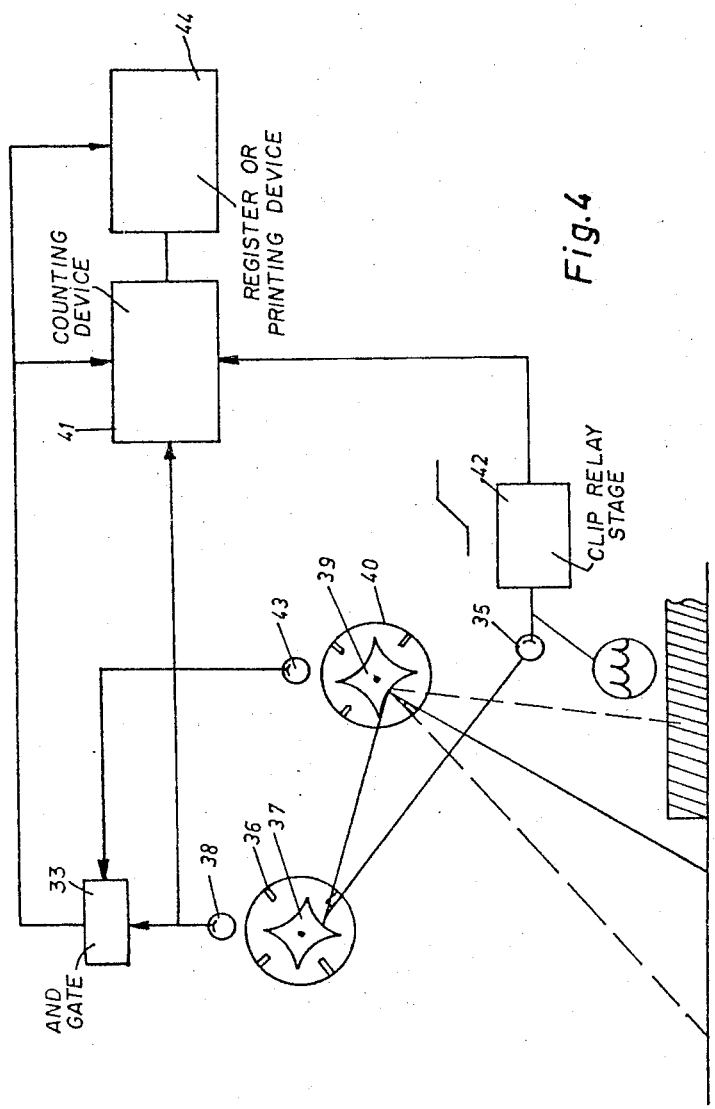

Nov. 28, 1967   M. C. PFISTER   3,355,591
PHOTOELECTRIC DEVICE FOR DETERMINING THE LENGTH
OR POSITION OF A SAMPLE USING SCANNER
AND ROTATING BEAM-CHOPPER
Filed Oct. 16, 1964   4 Sheets-Sheet 3
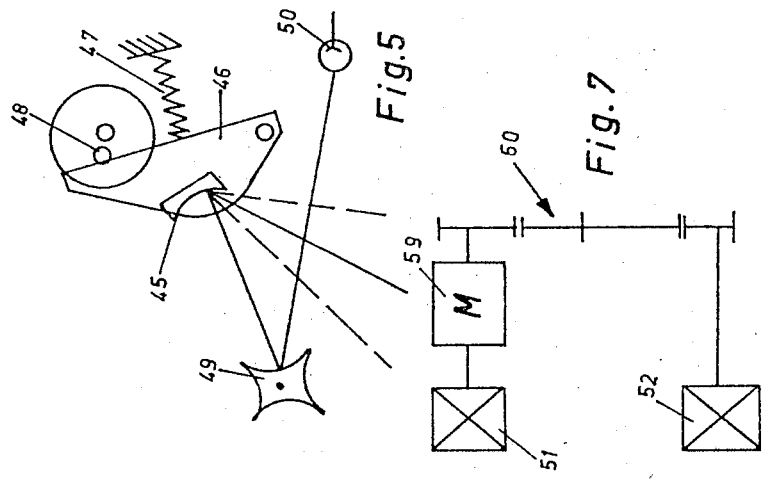
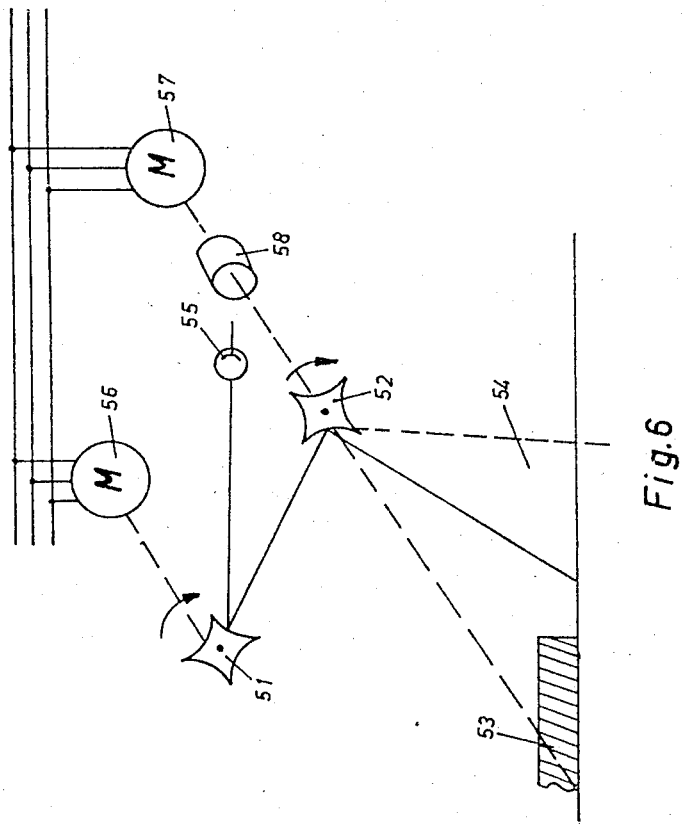
INVENTOR.
BY

United States Patent Office 3,355,591
Patented Nov. 28, 1967

3,355,591
PHOTOELECTRIC DEVICE FOR DETERMINING THE LENGTH OR POSITION OF A SAMPLE USING SCANNER AND ROTATING BEAM-CHOPPER
Marcel Charles Pfister, 123 Ave. du General de Gaulle, Eckbolsheim, near Strasbourg, France
Filed Oct. 16, 1964, Ser. No. 407,611
11 Claims. (Cl. 250—219)

ABSTRACT OF THE DISCLOSURE

A photoelectric apparatus is provided for determining the position or length of a radiant energy emitting object appearing within a portion of a field of view. The field of view is scanned by a mechanical scanning head which directs the radiant energy received from the object to a photoelectric detector. In the path of the energy between the scanner and the detector a rotating beam chopper is positioned. The movement of the chopper is integrated with that of the scanner. The effect of the scanner and the chopper is to cause the detector to briefly look at a succession of separate points along the line of scan.

---

This invention relates to a photoelectric device for determining the position or length of hot rolling stock. Therein, "length" may be any length dimension, for instance, also thickness, width or diameter. "Position" signifies the distance of a measuring object from a reference point.

Devices for determining the position or length of hot rolling stock are known wherein a field of view containing the rolling stock is periodically scanned in a narrow angle by a photoelectric detector via a rotating mirror. Then, the photoelectric detector when detecting the edge of the rolling stock supplies a jump signal, which, after differentiation, ignites a thyratron supplied with alternating current. The thyratron is supplied with the same alternating current which drives the rotating mirror by way of a synchronous motor so that supply voltage and scanning movement are of same frequency and in phase. In such manner the thyratron is ignited at a time depending on the position of the edge of the measuring object in the scanned field of view. The direct current mean value flowing through the thyratron is thus representative of the position of the edge of the rolling stock or of the measuring object in the field of view. Certain difficulties are encountered in these known devices to obtain sufficiently sharp pulses. The light flux to the photoelectric detector with the known devices follows the course of intensity of the scanned field of view, and there may well be times where this course of intensity when detecting the edge of the rolling stock does not at all correspond to an ideal rectangular jump. It may rather be, that by greater cooling of the rolling stock at the edges and heating of the contiguous portions, an almost steady increase of the intensity at the edge of the rolling stock may possibly occur. Likewise is the effect of the inertia of the commonly used photoelectric detectors which also do not react to a sudden change of the light flux impinging upon the detector with an ideal jump signal, but produce a steady signal increase. It should be noted that when scanning rolling stock it is not common to operate with normal photocells responding to visible light, but for instance with temperature sensitive photoresistance-cells (lead sulphide cells). These influences result in the fact that when the edge of the rolling stock is being detected there is no sharp pulse supplied to the grid of the thyratron, but a relatively wide pulse with undefined slope of transitional interval. This impairs the accuracy of the known arrangement and necessitates a considerable amount of circuitry so as to still obtain useful results.

The known device supplies the measuring value in analog form. However, it is frequently necessary or desirable to obtain the measuring value in digital form so as to avoid errors of readout and possibly to supply therewith a printing device or a data-consuming device. Analog-to-digital-conversion requires additional expense and involves further sources of error. (Compare the French patent specification 1,241,620.)

In a patent application not published prior thereto a photoelectric device has further been suggested for determining the position or length of rolling stock wherein a beam of collimated rays is partially shaded off by the measuring object and impinges upon a plurality of side-by-side optical members in the form of rod-shaped or cylinder lenses. Each of the partial beams not shaded off produces a discrete luminous image. These images are periodically scanned by a photocell by way of a mirror wheel and the photocell during one scan supplies a series of subsequent pulses the number of which is proportional to the magnitude of the portion of the field of view not shaded off, thus complementary to the length of the measuring object. These pulses may be supplied in a suitable manner to a counting device or a data-consuming device. This known device makes an auxiliary radiant source of prerequisite, which source produces a collimated beam of light. Besides optical members for producing the discrete luminous images in the form of cylinder lenses must be provided along the total field of view scanned, which is frequently not possible.

It is the object of this invention to provide an arrangement for the photoelectric measurement of position or length for hot rolling stock wherein also by way of a moved mirror image discrete contiguous points of a field of view containing the rolling stock are successively scanned and the thus obtained light-dark pulses counted so that the difficulties incurred with the known firing angle control are avoided, but where on the other hand neither a collimated beam of outside light nor an array of cylinder lenses along the scanned field of view is necessary.

According to this invention the object is being attained by providing that the path of rays has provided therein between the movable mirror member and the photoelectric detector periodically acting optical means in defined phase relation to the movement of the mirror member which permit the light reflected by the mirror member to pass to the detector by pulses. Thereby, the photoelectric detector is impinged upon by light by pulses only and accordingly it supplies only pulses as signals. The inertia of the detector cannot make an increase steady in an undefined manner from a jump signal from which by differentiation only an ignition pulse is again obtained. As the pulses are not dependent on the change in light flux when the edge of the measuring object is being detected as in the case of the known device operating with firing angle control, also a deviation of the course of the light flux from an ideal jump has no marked influence on the measuring result or the output signal of the detector circuit. Should the light flux exceed a certain threshold value, only the number of pulses is still of interest, but no more the magnitude thereof. There is also no firing angle control of a thyratron supplied with sinus-shaped alternating current and accordingly also the undesired sinus-shaped dependence between direct output current and firing angle is eliminated. Finally, the output is directly supplied in digital form as is required for modern installations.

The invention may be realized such that the moved mirror member scans the field of view relatively slowly and the periodically acting optical means operate with comparably high frequency. Therein, these optical means may be formed of a rotating chopper or also a mirror wheel by way of which the photoelectric detector scans a field of view containing said moved mirror member with high frequency. Every time the mirror member is "seen" by the detector, the detector obtains light from a specific location of the field of view containing the rolling stock by way of the mirror member and the mirror wheel. In dependence on whether this location is positioned on the rolling stock or not, the photoelectric detector supplies a light pulse or none at all. If the mirror wheel rotates further and the photoelectric detector detects the mirror member the next time, then this has rotated further in the meantime by a small amount so that now radiation from a point of the field of view moved by a small distance is passed on to the photoelectric detector. In dependence on whether this point is located on the rolling stock or not, a light pulse is obtained or none at all. In this manner the total field of view is being scanned in discrete points successively with at least approximately equal distances. As long as the rolling stock is being detected a series of light pulses is obtained and the number thereof counted. This number is representative of the length of the hot rolling stock present in the field of view.

This development of the device according to the invention sets high requirements to the accuracy of the movement of the scanning moved mirror member. Minor positional errors of the mirror member, say, by backlash in the bearings, may considerably influence the absolute accuracy of the measurement. This also applies to the prior known device with firing angle control according to the French patent specification 1,241,620. In further modification of this invention provision is therefore made that the moved mirror member scans the field of view periodically with high frequency and the periodically acting optical means operate with a frequency only deviating little from the scan frequency of the moved mirror member. Therein, for instance, the movable mirror member and the periodically acting optical means may be formed of two mirror wheels rotating in the same sense about axes parallel with respect to each other. Thus, in this embodied form the moved mirror member is not moved on slowly but a small amount between two pulses, but it substantially executes a full scan cycle, thus in the case of a mirror wheel having four mirrors a quarter rotation. Due to the rate or frequency difference, however, with the second pulse the position of the moved mirror member will lead or lag to a small extent with respect to the first pulse. Here too, the field of view with the rolling stock is therefore scanned pointwise in small steps. As the rate ratios may be adhered to with great accuracy and the backlash of the bearings is practically ineffective with rapid rotation the accuracy of the measurement may be increased further with this arrangement.

What is further substantial for the arrangement with two mirror wheels rotating in the same sense is the following: the photoelectric detector detects the mirror wheel located in the path of rays on the side of the measuring objective via the mirror wheel on the side of the detector during a finite time. A ray assumed to originate from the detector would have to be averted through a finite angle via the mirror wheel on the side of the detector so as to pass one time over the mirror wheel on the side of the measuring object. During such time, however, the mirror wheel on the side of the measuring object also rotates through an angle approximately equal to the angle of rotation of the mirror wheel on the side of the detector. It might be assumed that thereby there is no pulse produced from a defined location of the field of view containing the rolling stock, but that the scanning ray passes across a relatively great range of the field of view each time. This, however, does not apply. Assuming again that a radiant source be arranged at the location of the photoelectric detector from which a ray falls into the scanned field of view via the two mirror wheels, and further assuming that the mirror wheels rotate with exactly the same rate in the same sense of rotation, then the direction of the outcoming ray does not change. Inversely, with the same rate the same point of the field of view is scanned each time, and that is as long as the photoelectric detector "sees" the mirror wheel on the side of the measuring object. Due to the slightly different rates, however, the mutual angular position of the mirrors and thus the scanned point will slightly vary from one scan period to the next one. For the duration of one pulse, however, the scanned point may well be assumed as being stationary.

A few embodiments of the invention are presented in the drawings and described as follows:

FIG. 1 is a schematic representation of a first preferred embodied form of this invention;

FIG. 2 schematically illustrates the drive of the mirror wheels;

FIG. 3 illustrates the assembly of a mirror wheel;

FIG. 4 illustrates a modification of the arrangement of FIG. 1;

FIGS. 5 and 6 illustrate further embodied forms of this invention with slowly moved scanning mirror member;

FIG. 7 illustrates a modification of the embodied form of FIG. 6;

Figure 9:
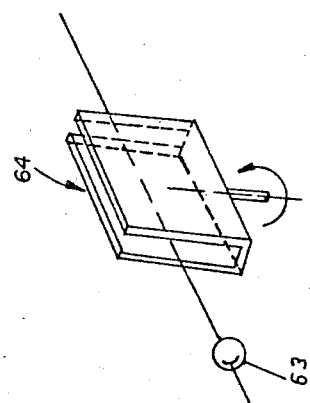
Figure 8:
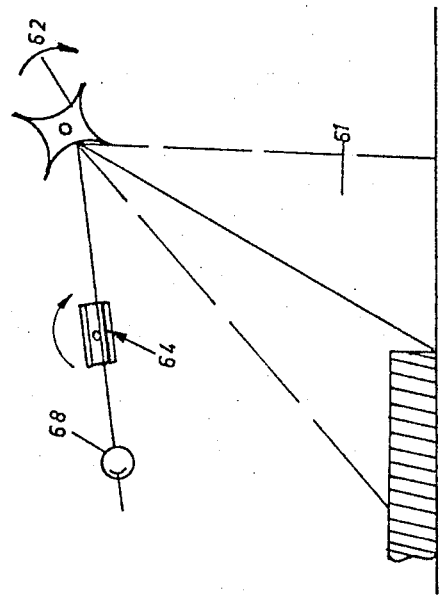
FIG. 8 illustrates an embodied form wherein the periodically acting optical means are formed of a rotating chopper.

FIG. 9 diagrammatically illustrates the development of the rotating chopper of FIG. 8.

In FIGS. 1 and 3 reference numeral 10 designates a field of view to be scanned containing a rolling stock block 11. A photoelectric detector 12 receives light from the field of view to be scanned 10 via two mirror wheels 13 and 14 rotating in the same sense and a linearizing mirror 15. The linearizing mirror is utilized to establish a linear connection between the angle of rotation of mirror 13 and the location in the scanned field of view 10 wherefrom light is directed via mirror 13 onto mirror 14. Via mirror wheel 14 the photoelectric detector 12 scans a field of view containing mirror wheel 13. At the moment when the photoelectric detector 12 detects mirror wheel 13 via mirror wheel 14, mirror wheel 13 reflects radiation from a specific location of the field of view 10 into the direction of mirror wheel 14. If both mirror wheels 13 and 14 rotate in the same sense and at almost equal rates, then during the total finite time during which the photoelectric detector 12 "sees" mirror wheel 13 via mirror wheel 14, only one single location of the field of view is being scanned.

In the illustrated manner the mirror wheels may be formed of four concave mirrors. The rays pass through a slit 16 of a scanning head housing 17 (not shown completely) onto mirror 15. Via the concave mirrors of the mirror wheels 13 and 14 one point of the linearizing mirror 15 is imaged on the photoelectric detector at one time during each scan period.

The drive of the two mirror wheels 13 and 14 is effected in the manner as described in FIG. 2 by a motor 18 the shaft of which has mounted thereon two gears 19 and 20. The gears 19 and 20 are coupled with gears 23 and 24, respectively, via belts 21 and 22, respectively. Gears 23 and 24 are mounted on the shafts of the mirror wheels 14 and 13, respectively. The transmission ratios of the gears 19 and 23 are 69:40 and that of gears 20 and 24 are 50:29. Accordingly, the rates of the mirror wheels 13 and 14 are in the ratio of $$\frac{50 \cdot 40}{29 \cdot 69} = \frac{2000}{2001}$$

When the mirror wheel 14 has executed a full revolution, the mirror wheel 13 has rotated further by slightly less than a full revolution. Thus, if at a moment where the photoelectric detector 12 detects mirror 13 via mirror 14, the location $x_1$ from the field of view was scanned by mirror 13, then after a full revolution of mirror 14 approximately point $x_2$ is being scanned. In each case of such coincidence, that is, if the photoelectric detector 12 detects the rotating mirror 13 via rotating mirror 14, the detector 12 either supplies a momentary pulse if the scanned point is located on radiating rolling stock, or no pulse at all, if the rolling stock is not being detected. Individual discrete points progressing stepwise across the field of view are being scanned. Thus mirror 13 (in conjunction with mirror 15) forms a scanning means for scanning the field of view 10 along a line in, and parallel to, the sheet of drawing. The beam from this scanning means 13 to detector 12 is chopped by rotating mirror 14.

With the described selection of rates and four mirrors on each mirror wheel an angular rotation of 90° of mirror wheel 13 with respect to mirror wheel 14 is resulting with 500 revolutions each. After such a 90° angular rotation the same optical relations are produced again as at the beginning of the 500 revolutions. Thus, a full scan of the field of view 10 is effected by 500 and 500 ¼ revolutions of the mirror wheels. By each revolution the field of view 10 is scanned four times and each time a specific stepwise progressing point of the field of view is imaged on the photoelectric detector. The total field of view scanned by a mirror of the wheels 13 and 14 during a quarter revolution covers 90°. This is divided into 2000 measuring points. Of these 90°, however, practically only 45° are utilized so that the utilized range is divided into 1000 parts. In these 1000 measuring points the field of view is successively scanned. The measuring points in which the radiating rolling stock is existing supply light pulses to the photoelectric detector 12. These pulses are counted and supply a measure for the length of rolling stock existing in the field of view 10.

To do this, a counting device 25 is provided to which the pulses of the detector 12 are supplied. Of course, the counting device may not count on ad infinitum, but should be queried in unison with the field of view scan and be reset.

To this end the shafts of the mirror wheels 13 and 14 have mounted thereon discs 26 and 27, respectively, having slots 28 spaced apart 90° at the rim thereof. As can be clearly seen in FIG. 3, the slots are scanned by photoelectric light barriers. These light barriers consist of one lamp 29 for each disc, which lamp illuminates the rim of the discs 26 and 27 respectively through a lens 30. A further lens 31 images the rim of the discs 26 and 27, respectively, on one photocell 32 each. Thereby, the photocells 32 supply a pulse each time when a slit 28 passes through the light barrier 29–32.

Normally, the pulses will originate from the two photocells 32 at different times. All 500 revolutions of the disc 27 the slits 27 and 28 will simultaneously pass through the associated light barriers and the detectors 32 simultaneously supply pulses. The pulses of the photocells 32 are supplied to an AND-gate 33. The AND-gate, as is well known, supplies an output signal if both inputs obtain a signal, and will not supply any output signal if only one of the inputs obtains a signal. Thus, the gate 33 supplies an output pulse if both pulses from the photocells 32 coincide. This pulse is existing at a moment where the mirror wheels 13, 14 scan the portion of the 90° field of view not utilized. One time, the pulse is read into the counting device 25 as reset command, the other time as interrogation command into a register 34 which queries the pulse number contained in the counting device and stores the same. This number may then be indicated, printed or fed to a data-consuming device for further compution.

In the modification of FIG. 4, which is of similar construction, the pulses of the photoelectric detector 35 which is impinged upon by the radiation from the field of view to be scanned are not counted, but the pulses passing to the photocell 38 (corresponding to 32 in FIGS. 1 and 3) from the slits 36 of the mirror wheel 37 (corresponding to 14) near the detector are counted. A mirror wheel 39 with a slit disc 40 corresponds to the parts 13 and 26 in FIGS. 1 and 3. The pulses from the photocell 38 are supplied to a counting device 41. However, the pulses of the photoelectric detector 35 are passed to a clip relay stage 42. At the first pulse of the stage 42 the latter trips and in this state it releases the counting device 41 so that the latter may count the pulses from photocell 38. The slit disc 40 supplies pulses to a photocell 43. The pulses of the photocells 38 and 43 form the two inputs of an AND-gate 33. With coincidence in time of the pulses from the photocells 38 and 43 a signal is first supplied to the counting device 41 where it interrupts the counting operation, and secondly to a register or a printing device 44 which queries the counting device 41.

In the embodied forms according to FIGS. 5, 6 and 7 the scanning of the field of view by the moved mirror member on the side of the measuring object is accomplished rather slowly as compared to the movement of the mirror wheel which passes the radiation from the scanned field of view only by pulses at defined instants to the detector. In the embodied form illustrated in FIG. 5 the moving mirror member consists of a simple concave mirror 45 on a plate 46. A spring 47 holds plate 46 against a crankpin 48 whereby the plate executes an oscillatory rotating movement. The second rapidly moved optical means is again a mirror wheel 49 in accordance with the mirror wheel 14 in FIG. 1. The mirror wheel 49 permits the light from mirror 45 to pass only by pulses to the photoelectric detector 50.

FIG. 6 shows an arrangement with two rotating mirror wheels 51, 52. The mirror wheel 52 on the side of the measuring object rotates comparatively slowly, whereas the mirror wheel 51 rotates 2000 times more rapidly. During the scan of the 45° field of view 54 containing the measuring object 53 by mirror 52 light is passed from mirror 52 via mirror 51 1000 times onto detector 55. Therewith the utilized field of view 54 is again divided into one thousand discrete measuring points. In the embodied form according to FIG. 6 the two mirror wheels 51 and 52 are driven by separate synchronous motors 56 and 57, respectively being supplied from a common three-phase mains. Between motor 57 and mirror wheel 52 a reduction gear 58 is provided.

In the embodied form according to FIG. 7 the two mirror wheels 51 and 52 are driven by a single motor 59, however, the mirror wheel 52 via a reduction gear 60 with a reduction of 1:2000.

FIGS. 8 and 9 illustrate an arrangement wherein the scan of the field of view 61 is effected by means of a moved mirror member operating periodically with high frequency in the form of a mirror wheel 62 and also periodically acting optical means are provided operating with a frequency which only deviates slightly from the scan frequency of the mirror wheel 62 and thus permit a pointwise scan of the field of view 61 by means of a photoelectric detector 63. However, these periodically acting optical means are not provided by a second mirror wheel, but by a chopper 64 which permits the light from mirror wheel 62 to temporarily pass onto the detector. This chopper is formed by a U-shaped part, as may be best seen in FIG. 9, which permits the light to pass only to the detector during the short interval during which the lateral surfaces of the U are arranged substantially in parallelism with the beam axis.

The invention is claimed as follows:

1. In an apparatus for determining the position or length of a radiant energy emitting object wherein a field of view, including a part of the object, is scanned by a moving scanning means driven by power means at a given rate with the radiant energy beam received by the scanning means traversing a path to a radiant energy detector, the improvement comprising: power driven beam chopping means interposed in said path to periodically break the beam, said beam chopping means being connected to said power means to break the beam at a rate which is a function of said given rate and in predetermined phase relationship with respect thereto, whereby the detector produces electrical impulses to the extent that said object is in said field; and actuated means connected to the detector.

2. In an apparatus as set forth in claim 1, wherein said scanning means includes a rotating mirror and said beam chopping means includes a rotating mirror and said periodic rate differs from said given rate.

3. In an apparatus as set forth in claim 2, wherein said actuated means includes a counter, and said apparatus includes: a first device connected to said scanning means to produce electrical pulses at a function of said given rate, a second device connected to said chopping means to produce electrical pulses at a function of the rate of breaking the beam; and a gate connected to said devices to produce a signal when said pulses coincide in time; and means connecting the gate and the counter to read and reset the counter upon the occurrence of said signal.

4. In an apparatus as set forth in claim 2, wherein the periodic rate of the beam chopping means differs only slightly from said given rate.

5. In an apparatus as set forth in claim 2, wherein said periodic rate of beam chopping is greatly in excess of said given rate.

6. In an apparatus as set forth in claim 2, wherein said power means includes a synchronous electric motor, said motor being mechanically connected to the beam chopping means to rotate the same.

7. In an apparatus as set forth in claim 2, wherein said mirrors rotate in the same direction of rotation about respective axes which axes are parallel to each other.

8. In an apparatus as set forth in claim 2 for use with an alternating current electric supply, said power means including a synchronous electric motor connected to said supply, said chopping means including a second synchronous electric motor connected to said supply.

9. In an apparatus as set forth in claim 1, including: a first device connected to said scanning means to produce electrical pulses at a function of said given rate, a second device connected to said chopping means to produce electrical pulses at a function of the rate of breaking the beam; and a gate connected to said devices to produce a signal when said pulses coincide in time; and means connecting the gate and the actuated means.

10. In an apparatus as set forth in claim 9, wherein the actuated means includes a counter to count the electrical impulses from the detector, the last mentioned means being effective to read and reset the counter upon the occurrence of said signal.

11. In an apparatus as set forth in claim 9, wherein the actuated means includes a counter to count said signals from the gate, said actuated means being effective to read and reset the counter upon an impulse from the detector.

References Cited

UNITED STATES PATENTS

| | | | |
|---|---|---|---|
| 3,066,226 | 11/1962 | Lindstrom | 250—219 |
| 3,094,623 | 6/1963 | Weiss | 250—219 |

ARCHIE R. BORCHELT, *Primary Examiner.*

RALPH G. NILSON, *Examiner.*

M. ABRAMSON, *Assistant Examiner.*